United States Patent [19]

Guslits

[11] Patent Number: 4,606,492
[45] Date of Patent: Aug. 19, 1986

[54] METHOD AND APPARATUS FOR SOLDERING

[75] Inventor: Vladimir S. Guslits, Rochester, N.Y.

[73] Assignee: Eastman Kodak Company, Rochester, N.Y.

[21] Appl. No.: 657,311

[22] Filed: Oct. 3, 1984

[51] Int. Cl.$^4$ ............................................ B23K 31/02
[52] U.S. Cl. ...................................... 228/179; 228/20; 228/52
[58] Field of Search .................. 228/179, 52, 53, 256, 228/6.2, 57, 20

[56] References Cited

U.S. PATENT DOCUMENTS

| | | |
|---|---|---|
| 1,010,742 | 12/1911 | Dryfoos . |
| 1,020,971 | 3/1912 | Dryfoos . |
| 1,520,645 | 12/1924 | Grevers et al. . |
| 1,928,576 | 9/1933 | Stedley ................................ 228/14 |
| 3,068,823 | 12/1962 | Nyborg ................................ 113/59 |
| 3,437,252 | 4/1969 | Beaver et al. ....................... 228/53 |
| 3,570,742 | 3/1971 | Graham ............................... 228/53 |
| 3,652,819 | 3/1972 | Kerr et al. ........................... 219/85 |
| 3,705,680 | 12/1972 | Siegel .................................. 228/57 |
| 3,797,725 | 3/1974 | Mori et al. .......................... 228/41 |
| 3,812,581 | 5/1974 | Larson et al. ....................... 228/13 |
| 3,921,249 | 11/1975 | Fortune .............................. 228/20 |
| 4,187,973 | 2/1980 | Fortune .............................. 228/20 |
| 4,216,894 | 8/1980 | Gleizes ............................... 228/52 |
| 4,493,449 | 1/1985 | Kleiman ............................. 228/57 |

Primary Examiner—Nicholas P. Godici
Assistant Examiner—Karen Skillman
Attorney, Agent, or Firm—Robert L. Randall

[57] ABSTRACT

Soldering apparatus which comprises a frame member and a reciprocating member movably mounted on the frame member for movement with respect to an anvil member having a component to be soldered supported thereon. A soldering tip is mounted on the reciprocating member and has a soldering face which is moved on an advance stroke into contact with the component on the anvil member to heat the component to soldering temperature. A generally vertical passage is formed through the soldering tip and opens at the lower end through the soldering face. A roll of solder wire is provided for supplying a predetermined quantity of flux-cored solder into the upper end of the passage to fall into contact with the heated component whereby the flux is automatically heated and melted to clean the surface of the component before the solder is melted to form the soldered joint. An air jet or a reamer is also provided for cleaning the passage during a return stroke.

9 Claims, 3 Drawing Figures

METHOD AND APPARATUS FOR SOLDERING

BACKGROUND OF THE INVENTION

1. Field of the Invention

This invention relates to a method and apparatus for soldering and, more particularly, to apparatus for automatically soldering electrical terminals.

2. Description of the Prior Art

A variety of automatic soldering apparatus for high production operation is presently known in the art. One system currently used employs a bath of molten solder through which the terminals to be soldered are passed. One particularly popular molten solder system is the wave soldering system in which a wave of molten solder is generated above the level of the molten solder bath with a circuit board carrying the terminals to be soldered being passed tangentially into contact with the surface of the wave. This system requires an appreciable amount of time to bring the solder bath to temperature and necessitates keeping the solder bath hot when there is no demand. This type of mass soldering also requires that steps be taken to minimize or preclude the formation of oxides on the surface of the molten solder bath. This method of soldering also is limited to use on circuit boards which are provided with connections to be soldered on one surface only, with no electrical components being on that side. Otherwise, electrical components on that side of the circuit board would be immersed in the molten solder which could render the components inoperative. Thus, mass soldering systems are limited to those applications in which high volume similar components can be designed with a surface adaptable for passing through or into contact with the molten solder bath.

In another system of automated soldering the components are precoated with solder and, when joined to form the connection, are heated by a flow of hot air or by the focussing of a laser or infrared beam on the joint to heat and melt the solder. This system suffers from the problem of surface oxidation before the joint is formed, resulting in joints which are unsatisfactory.

A third system of automatic soldering utilizes a soldering iron having a molten solder reservoir contained therein which is fed to the solder joint on demand. This system also suffers from the potential oxidation of the molten solder, resulting in less than adequate solder joints.

These last two systems of soldering suffer from the disadvantage that either flux is not employed to clean the surfaces to be joined, or additional, costly and complex apparatus is necessary to separately supply the flux at the appropriate time in the operational sequence.

Still another system of automatic high production solder apparatus utilizes a means for heating the soldering tip and/or the component to be soldered and advancing and feeding solder wire against the preheated part. It has been found that it is difficult to satisfactorily feed the solder wire to the component at the desired speed and yet obtain the necessary heating of both of the solder and the component. At the same time, oxidation of both the component and the solder has been a problem.

Furthermore, in the last noted system utilizing a solder wire feeding device, if flux-cored soldered wire were utilized, the melting temperature of the flux was sufficiently lower than the melting temperature of the solder that, by the time the solder had melted to form the joint, using e.g. ⅛ inch of solder, flux from ½ inch or more of the solder wire had been melted and had flowed out of the solder wire. Accordingly, and in addition to the mess created by the excess flux at that joint, subsequent solder joints would be formed without the benefit of flux to clean the joint surfaces before the solder was applied.

SUMMARY OF THE INVENTION

Accordingly, the present invention provides an improved automatic soldering apparatus wherein the components to be soldered are positioned on an anvil and a heated soldering tip is moved into contact with the joint, heating it to the soldering temperature. A generally vertical passage is provided through the soldering tip and means is provided for supplying a predetermined quantity of flux-cored solder to the upper end of the passage after the components have been heated to the soldering temperature. Accordingly, the apparatus of the present invention provides no solder to the joint before the components are heated to the soldering temperature. A predetermined quantity of flux-cored solder is provided to the joint thereby reducing waste and excess solder at the joints while assuring that the joint surfaces are adequately fluxed to produce a satisfactory joint. Moreover, the present apparatus is self-cleaning thereby reducing interruptions to the automatic process. Most importantly, the apparatus of the present invention reduces oxidation possible with molten solder reservoirs since the solder is not melted until it is in contact with the components to be joined.

More specifically, the present invention provides automatic soldering apparatus comprising a frame member carrying a reciprocating member movably mounted thereon with means for driving the reciprocating member through an advance stroke and a return stroke. An anvil member is arranged to support a component to be soldered in alignment with the reciprocating member. A soldering tip is mounted on the reciprocating member and has a soldering face which is moved into contact with the component supported on the anvil during the advance stroke and out of contact with the component during the return stroke. Means is provided for heating the soldering tip and means is provided for forming a generally vertical passage through the soldering tip and opening at the lower end through the soldering face. A solder wire supply means feeds flux-cored solder to a cutting means which is arranged to cut a predetermined quantity of solder from the solder wire supply means and introduce it into the upper end of the generally vertical passage to fall into contact with the heated component whereby the flux is automatically heated and melted to clean the surface of the component before the solder is melted to form the joint.

Furthermore, the present invention provides means for cleaning the generally vertical passage through the soldering tip during the return stroke.

DESCRIPTION OF THE PREFERRED EMBODIMENT

Figure 1:
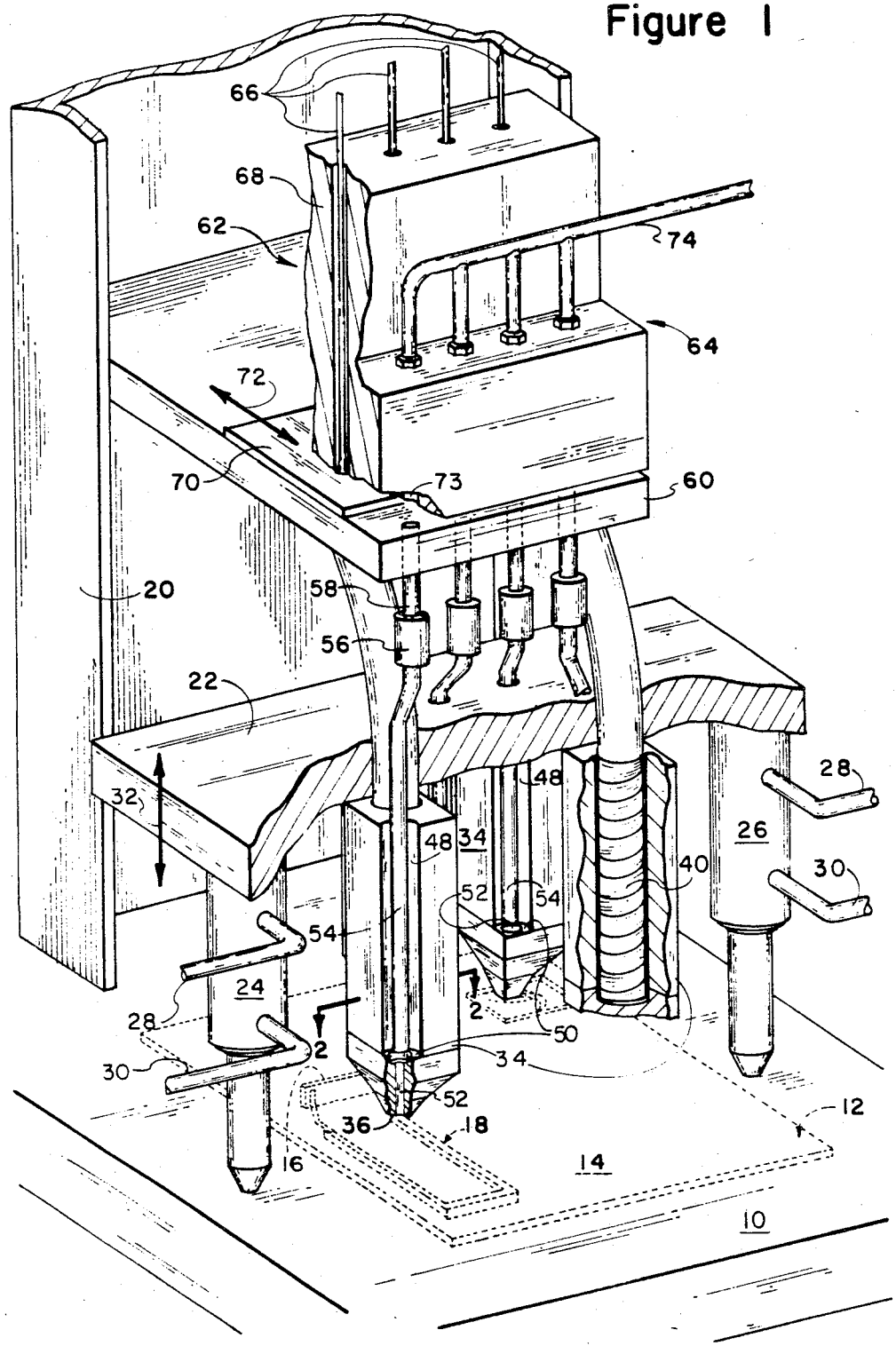
FIG. 1 is a perspective view, partly in section, of an embodiment of the automatic soldering apparatus in accordance with the present invention.

A preferred embodiment of the present invention, comprising a single soldering station is illustrated in FIG. 1 and comprises an anvil member 10 forming an anvil which is arranged to support a component to be soldered. In the example illustrated, the component 12 to be soldered is illustrated in phantom and comprises a circuit board 14 having one or more components 16 mounted for connection thereon. When the circuit board is introduced into the soldering apparatus, the components 16 are physically supported thereon and are arranged to be connected by means of a solder connection to a circuit component 18 on the board 14. While a circuit board is described herein for the purposes of illustrating the invention it will be appreciated that other soldered assemblages may be satisfactorily soldered with the apparatus of the present invention.

The soldering apparatus further comprises a frame member 20 which is supported by and connected to the anvil member 10 and extends vertically upward therefrom. A reciprocating plate member 22 is movably mounted on the frame member by standard means, not shown, and is provided with actuating means 24 and 26, such as electric actuators, pneumatic or hydraulic cylinders connected to a power supply via lines 28 and 30, or any other activators well known in the art. The actuating means is arranged to drive the reciprocating plate member 22 through an advance stroke and a return stroke, generally in the directions of arrow 32.

Figure 2:
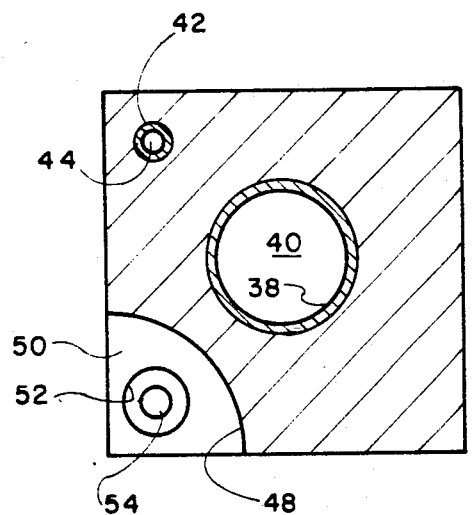
FIG. 2 is a sectional view of a soldering tip taken along line 2—2 of FIG. 1.

Mounted on and carried by reciprocating plate member 22 are a plurality of soldering tips 34, four of which are illustrated in FIG. 1. The soldering tips may be so mounted to the plate to facilitate easy rearrangement to adjust to different component configurations. Each soldering tip is connected at its upper end to the lower surface of the reciprocating plate member, by conventional means not shown, and is provided at its lower end with a soldering face 36 which is arranged to contact the component to be soldered (supported on the anvil member 10) when the reciprocating plate member 22 is driven through the advance stroke. It will be noted that the distance travelled by the reciprocating plate member and the attached soldering tips during the advance and return strokes is sufficient to permit easy introduction and removal of the component to be soldered, in a manner well known in the art and yet provide a predetermined pressure to the component to be soldered to enhance the heat transfer thereto. Each soldering tip 34 is formed of a conductive metal such as copper, in a manner well known in the art, and is provided with an axially extending bore 38 (see FIG. 2) which is arranged to accept an electric heater cartridge 40 which extends thereinto and heats the soldering tip to the desired temperature. A second bore 42 is provided to receive a temperature sensing device, such as thermocouple 44, to provide the desired temperature regulation of the soldering tip. As illustrated in FIGS. 1 and 2, one vertical corner of the soldering tip is relieved at 48. The relief 48 extends from the upper end of the soldering tip toward the soldering face, terminating in shoulder 50 spaced a short distance above the soldering face 36. A generally vertical passage 52 is formed in the soldering tip from the shoulder 50 through the soldering face 36. The generally vertical passage 52 is arranged to open directly onto the component to be soldered 12 when the soldering tip 34 is in contact therewith.

A solder supply conduit means 54 extends through and is supported by plate 22. The lower portion of the conduit means extends along the relieved portion 48 of the soldering tip 34 into close proximity and alignment with the upper end of the vertical passage 52 at shoulder 50. Care is taken to assure that the conduit means does not contact the relieved portion 48 or the shoulder 50 so as to insulate the conduit from the heated soldering tip 34. The upper end of conduit 54, above plate 22, terminates in a slip coupling 56 which enables the conduit 54 to move vertically with plate 22 and still be maintained in alignment with a conduit extension 58 which is supported by and depends from stationary plate 60 above the reciprocating plate member 22.

The stationary plate 60 extends from and is supported by the frame member 20 and supports the conduit extensions 58 which extend therethrough. A solder feed and metering means 62 and a portion of a passage cleaning means 64, both of which are more thoroughly described hereinbelow, are also supported by plate 60.

The solder feeding and metering means 62 comprises means for supplying solder wires 66, one for each of the soldering tips 34 incorporated in the apparatus (four in this example), such as a plurality of spools of rolled flux-cored solder wire, not shown. The solder wire is fed into a solder wire drive device 68, of any of a variety of types known in the art, which advances a predetermined quantity of solder wire on each activation of the device, in a manner well known in the art. Cutting means 70, such as a guillotine blade, driven in a reciprocating motion such as illustrated by arrow 72, by an actuating means not shown, is arranged to cut a predetermined quantity of solder wire from each of the solder wire supply means and introduce the cut portion into the upper end of each conduit extension 58. From this introduction location, the cut portions fall through solder supply conduits 54 and into the generally vertical passages 52 in the soldering tips 34 into contact with the heated components being soldered. Inasmuch as the cut portions of the solder fall directly through the conduits and passages, and since the conduits are substantially insulated from the soldering tips, only minimal heat is imparted to the cut portions before they contact the heated components being soldered.

As illustrated in FIG. 1, the solder wire drive device 68 is disposed out of alignment with the conduit extensions 58. The passage cleaning means 64 comprises a cleaning fluid outlet 73 aligned with each conduit extension 58 and supplied by conduits 74. In the preferred embodiment the cleaning fluid is compressed air which, at the appropriate time in the cycle, is blown through the conduit extensions 58, solder supply conduits 54, and vertical passage 52, to assure that no residual solder remains therein.

It will be appreciated that while a single soldering station has been described with four soldering tips associated therewith, the number of soldering tips per station, and the number of stations necessary to solder a complete circuit board may vary with the requirements of each specific circuit board or other assemblage design.

The operation of the apparatus of the present invention commences with the reciprocating plate member 22, and the associated soldering tips 34, in the uppermost position and with the heater cartridges 40 actuated to bring the soldering tips to the desired operating temperature. A component 12 to be soldered, having a plurality of electrical components 16 mounted on the circuit board 14 is introduced onto the anvil 10 and is disposed with at least some of the connections in alignment with respective soldering tips 34. The pneumatic or hydraulic cylinders 24 and 26 are actuated, bringing the reciprocating plate member 22 and the soldering tips 34 downwardly so that the soldering faces 36 contact the connections to be formed. After the soldering faces have contacted the connections for a sufficient length of time to bring the connection to the soldering temperature, the cutting means 70 is actuated, cutting off a predetermined quantity of flux-cored solder from the end of each solder wire 66, and transporting them to the upper end of conduit extensions 58. The cut portions drop through the conduit extensions, through the slip couplings 56 into the conduit means 54 and then into vertical passages 52 and into contact with the connections to be formed. Because the connections have been previously brought to the soldering temperature, the flux contained in the predetermined quantity of flux-cored solder melts and flows around the connection to be formed almost instantaneously, cleaning the surfaces as the solder itself quickly melts to subsequently form the joint, and the cylinders 24 and 26 are then actuated to lift the reciprocating plate member 22 and the soldering tips 34 away from the components on the circuit board 14. At this point the circuit board is removed from the soldering station and is transported away therefrom. After the soldered circuit board has been removed from the soldering station a jet of air, supplied through conduit 74, is introduced into the upper end of conduits 58 and blows therethrough assuring that there is no accumulation of solder or other material within the conduits or the passages 52. The apparatus is thus ready for receipt of the next components to be soldered.

ALTERNATIVE EMBODIMENT

Figure 3:
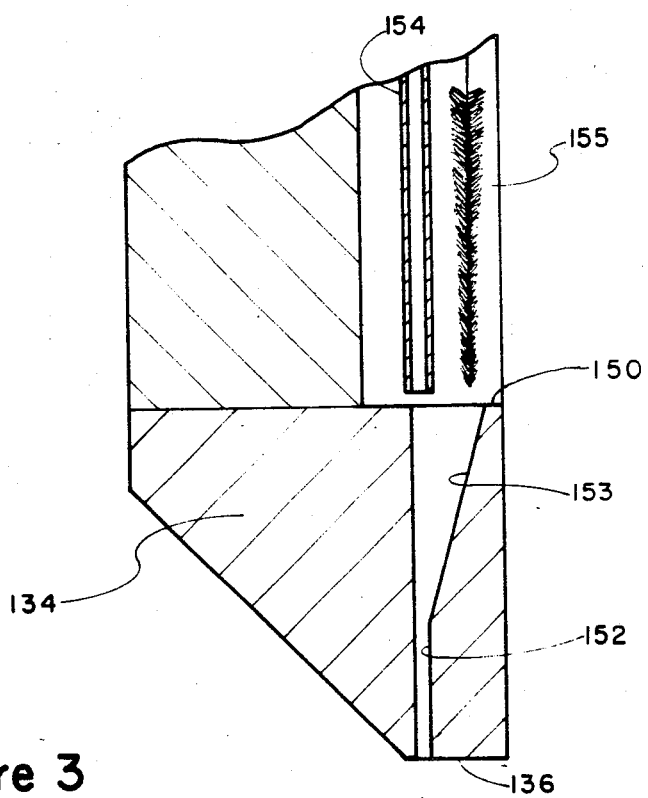
FIG. 3 is a detail view of an alternative embodiment.

A detailed view of a soldering tip incorporating an alternative embodiment is illustrated in FIG. 3, wherein like elements are given the same reference numeral with the prefix "1". In this view a section is taken through the passage 152 through the soldering tip 134 from the shoulder 150 to the soldering face 136. In this embodiment the passage 152 is provided with an upper portion 153 which is enlarged to permit the entry of a cleaning brush 155 which depends along the side of conduit 154. This cleaning brush 155 replaces the jet of air illustrated in the preferred embodiment and functions to mechanically ream and clear the passage 152 of any residual solder by being mechanically driven into the passage after the soldering tip has been moved to the upper position and the component 12 removed from the anvil at the end of the soldering operation. The brush is then arranged to be removed from the passage before the soldering tip returns to the lower end of the stroke for the next soldering operation.

Similarly, while air has been described as the preferred cleaning fluid to be blown through the passages, other gases, inert or not, may be used.

It will be seen that the present invention provides soldering apparatus which can automatically solder electrical terminals without the drawbacks of soldering apparatus known in the prior art. For example, it will be appreciated that no solder is provided to the components before they have been heated so that there is less opportunity for the solder to become oxidized which would interfere with the formation of satisfactory joints. Moreover the parts themselves are not heated for any appreciable time before the solder is applied, minimizing the problem of oxidation or damage thereto. Further, the present invention automatically provides the desired quantity of flux and solder for each joint formed so that a sufficient amount is provided without risking the problems of under or over supply. Still further, the present invention provides apparatus which is self-cleaning so that maintenance is minimized.

Still further the present invention provides an automatic soldering device which is capable of providing a high output, but still has the flexibility for adaptation to different production requirements, merely by rearranging the positioning of the soldering tips on the reciprocating plate member to meet the requirements of a different arrangement of components to be soldered.

The invention has been described with reference to specific embodiments and variations, but it should be apparent that other modifications and variations can be made within the spirit and scope of the invention, which is defined by the following claims.

I claim:

1. Soldering apparatus comprising:
   a frame member;
   a reciprocating member movably mounted on said frame member,
   means for driving said reciprocating member through an advance stroke and a return stroke,
   an anvil member arranged to support a component to be soldered in alignment with said reciprocating member,
   a soldering tip mounted on said reciprocating member and having a soldering face which is moved into contact with said component supported on said anvil member during said advance stroke and out of contact with said component during said return stroke,
   means for heating said soldering tip,
   means forming a generally vertical passage through said soldering tip opening at the lower end through said soldering face,
   flux-cored solder wire supply means,
   cutting means for separating a predetermined quantity of flux-cored solder from said solder wire supply means, and
   means for introducing said predetermined quantity of flux-cored solder into the upper end of said generally vertical passage after said soldering tip has been moved into contact with and heated said component whereby the solder is melted by contact with said component.

2. The invention according to claim 1 including means for cleaning said passage during said return stroke.

3. The invention according to claim 2 wherein said passage cleaning means includes means for introducing a jet of fluid into said passage during said return stroke.

4. The invention according to claim 2 wherein said passage cleaning means includes reaming means engaging said passage at the end of said return stroke.

5. The invention according to claim 1 wherein said means for introducing said predetermined quantity of solder into the upper end of said generally vertical passage includes conduit means leading from said cutting means to said generally vertical passage through said soldering tip.

6. The invention according to claim 5 wherein said conduit means is spaced from said soldering tip to thereby insulate said conduit means from said soldering tip.

7. The invention according to claim 5 wherein said conduit means is mounted on said reciprocating member for movement with said soldering tip.

8. A method of soldering using a soldering apparatus having:
- a frame member, a reciprocating member movably mounted on said frame member,
- means for driving said reciprocating member through an advance stroke and a return stroke,
- an anvil member arranged to support a component to be soldered in alignment with said reciprocating member,
- a soldering tip mounted on said reciprocating member and having a soldering face which is moved into contact with said component supported on said anvil member during said advance stroke and out of contact with said component during said return stroke,
- means for heating said soldering tip,
- means forming a generally vertical passage through said soldering tip opening at the lower end through said soldering face,
- flux-cored solder wire supply means,
- cutting means for separating a predetermined quantity of solder from said solder wire supplied by said supply means, and means for introducing said predetermined quantity of solder into the upper end of said generally vertical passage, said method of soldering comprising the steps of:
- supporting the component to be soldered on said anvil,
- moving said heated soldering tip into contact with said component,
- heating said component with said heated soldering tip,
- severing a predetermined quantity of flux-cored solder from said solder wire supplied by said supply means and introducing it into the upper end of said passage to drop into contact with said component whereby the flux is automatically heated and melted to clean the surface of the component before said quantity of solder is melted to form the connection,
- withdrawing said heated soldering tip from said component,
- removing said component from said anvil, and
- then cleaning said passage.

9. The invention according to claim 8 wherein said passage cleaning step includes blowing air through said passage.

* * * * *